US006592705B1

(12) United States Patent
Rosebrock

(10) Patent No.: US 6,592,705 B1
(45) Date of Patent: Jul. 15, 2003

(54) METHOD FOR TREATING FOAM BOARD TO PERMIT IT TO BE ACCORDION FOLDED

(75) Inventor: Scott A. Rosebrock, Saginaw, MI (US)

(73) Assignee: Energy Solutions, Inc., Saginaw, MI (US)

( * ) Notice: Subject to any disclaimer, the term of this patent is extended or adjusted under 35 U.S.C. 154(b) by 95 days.

(21) Appl. No.: 09/699,069

(22) Filed: Oct. 28, 2000

(51) Int. Cl.[7] .............................................. B32B 31/00

(52) U.S. Cl. ....................... 156/268; 156/204; 156/211; 156/227; 83/880; 83/882; 83/885

(58) Field of Search ................................ 156/268, 227, 156/257, 269, 253, 535, 204, 211; 428/181, 155, 156, 158, 52, 167, 130; 83/875, 861, 876, 879, 880, 882, 883, 884, 885, 886; 270/39.01, 39.02, 39.05, 39.4

(56) References Cited

U.S. PATENT DOCUMENTS 1,796,670 A * 3/1931 Thoma ....................... 156/223
3,032,337 A 5/1962 Holman
3,368,692 A * 2/1968 Voller ......................... 156/204
4,035,538 A 7/1977 Maekawa et al.
4,379,419 A * 4/1983 Woock et al. ................ 33/437
4,694,722 A * 9/1987 Collier et al. ................. 83/885
4,764,420 A * 8/1988 Gluck et al. ............... 264/45.3
4,954,202 A * 9/1990 Price et al. ................. 156/220
5,613,417 A * 3/1997 Scobbie et al. ............... 83/152

* cited by examiner

*Primary Examiner*—Michael W. Ball
*Assistant Examiner*—John L. Goff
(74) *Attorney, Agent, or Firm*—Reising, Ethington, Barnes, Kisselle & Learman, P.C.

(57) ABSTRACT

A method of and apparatus for treating foam board to permit it to be accordion folded involves moving an elongate foam board along a longitudinal pathway into a slitting machine, stopping the travel of the board and clamping it in stationary position, and then laterally simultaneously moving pairs of longitudinally spaced upper and lower slitters, which produce alternate slits less than through the thickness of the board to leave a foldable thickness, across the board. The board is then released to be accordion folded.

16 Claims, 4 Drawing Sheets

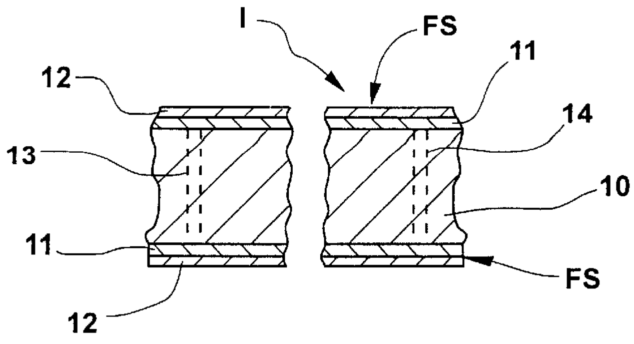
FIG - 1
FIG - 3
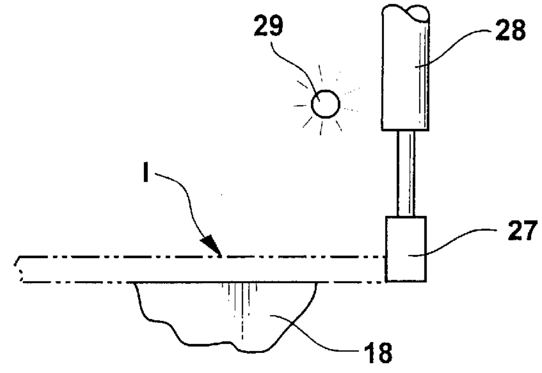
FIG - 4
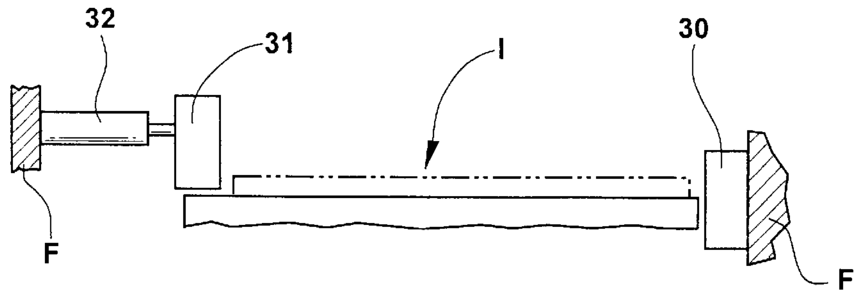
FIG - 5
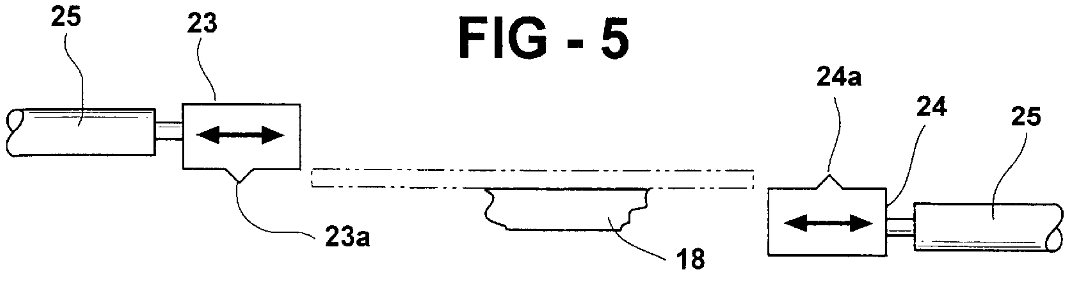

METHOD FOR TREATING FOAM BOARD TO PERMIT IT TO BE ACCORDION FOLDED

This invention relates to the processing of substantially rigid elongate foam boards which are used as insulation panels at construction and roofing sites and need to be accordion folded so that they can be more readily transported to the site.

BACKGROUND OF THE INVENTION

The present invention provides a method which is well suited to use in a plant utilizing a laminating machine to produce a board which is provided on its upper and lower surfaces with a cover film and then cut into elongate lengths which are fed to an elongate slitting machine upstream of an accordion folding station where folding may be accomplished manually or mechanically.

The board to be processed comprises a closed cell foam board bounded on each of its upper and lower surfaces by facer strips comprising a Kraft paper facer bonded to the core foam and having an outer plastic cover facer film bonded to it.

It is an important object of the present invention to provide an improved and economic method of treating the foam board, which may be in the nature of a half-inch in thickness, to provide alternating upper and lower slits, which do not extend all the way through the composite board, at preselected longitudinal intervals to provide folding sections in a precision manner.

A further object of the invention is to provide a highly reliable method and apparatus which rapidly and efficiently handles the foam board in a manner which does not result in undue down time in the production line.

BRIEF SUMMARY OF THE INVENTION

The invention is concerned with a method of and apparatus for treating foam board to so slit it as to permit its ready accordion folding without the creation of undue quantities of scrap. The board is moved along a longitudinal pathway, at a temperature which is less than a temperature which would deform the substantially rigid foam board, into a slitting machine. After traveling into the machine, the board is stopped and clamped in stationary position and laterally moving longitudinally uniformally, spaced upper and lower slitting members which provide slits less than the thickness of the overall board, move laterally across the board to provide folding sections in the board. The board is then released to travel to a folding station where accordion folding takes place.

Other object and advantages of the invention will become apparent with reference to the accompanying drawings and the accompanying descriptive matter.

BRIEF DESCRIPTION OF THE DRAWINGS

The presently preferred embodiment of the invention is disclosed in the following description and in the accompanying drawings, wherein:

FIG. 1 is a schematic, cross-sectional fragmentary view of a board illustrating the slits which are formed therein;

FIG. 3 is an enlarged schematic fragmentary view showing the insulative board length being halted, once it is fed into the machine;

FIG. 4 is a schematic fragmentary view showing the mechanism for laterally moving the board against a side clamp guide system to laterally align and clamp it;

FIG. 5 is a similar schematic transverse fragmentary view illustrating the slitting members which travel laterally to slit the foam board from above and below;

DETAILED DESCRIPTION OF THE DRAWINGS

Figure 2:
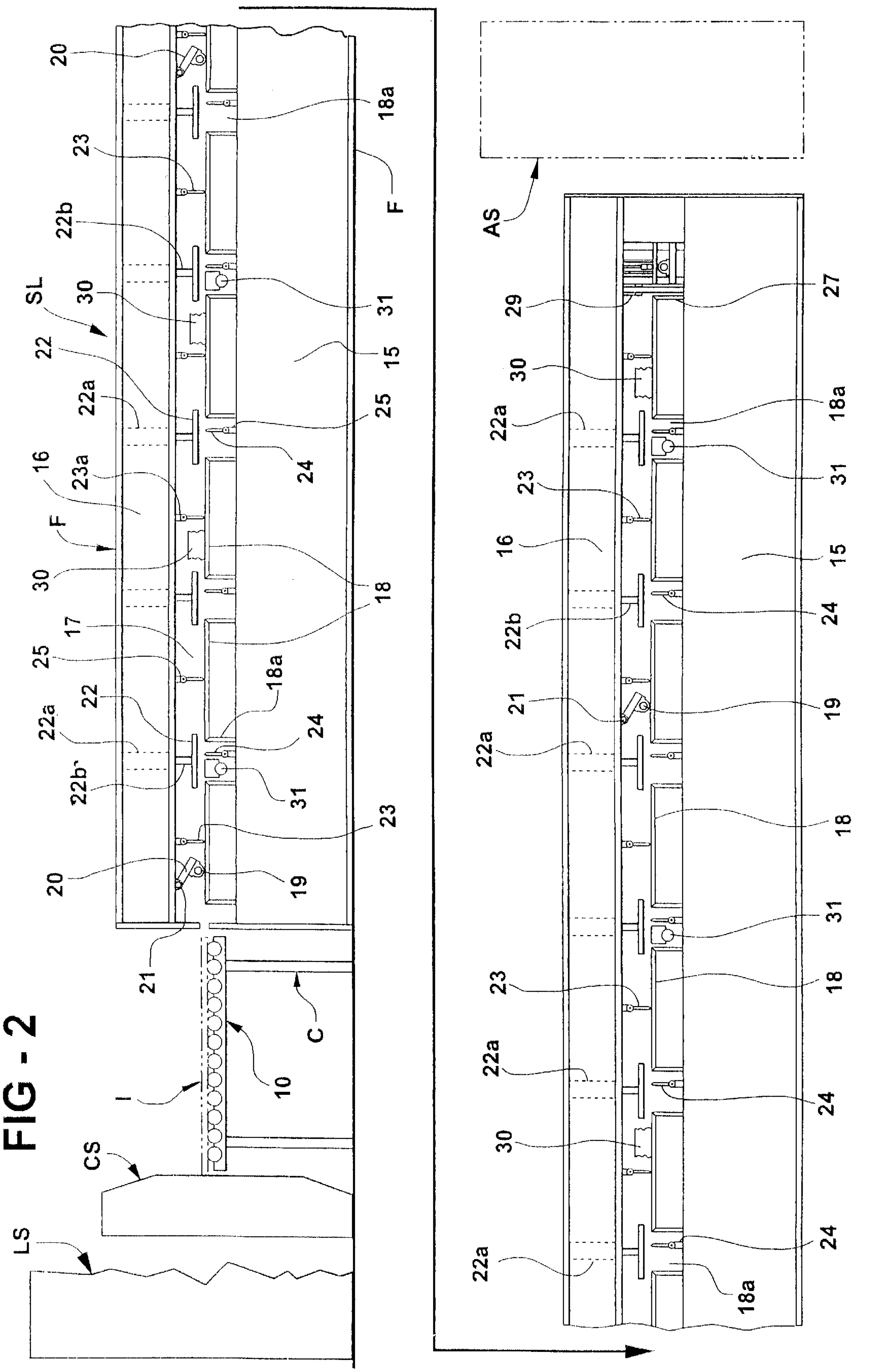
FIG. 2 is a schematic, longitudinally split, side elevational view of the slitting machine illustrating a length of insulative board in position to be fed into the slitting machine.

Referring now more particularly to the accompany drawings and, in the first instance, to FIG. 1, the insulative board, generally designated I, comprises a closed cell foam board core 10 bounded on each of its upper and lower surfaces by facer strips FS which are bonded in position at a conventional laminating station in a laminating machine (not shown) to form a laminate or overall board I.

The facer strips FS disclosed may comprise a Kraft paper inner facer 11 of about 0.00858 in thickness covered by an outer synthetic plastic cover film facer 12 which may have a thickness in the nature of 1 mill. Typically, the plastic film 12 will be polyethylene or polypropylene, or another suitable thermoplastic plastic. After slitting, the board I will have an upwardly open slit 13 extending through the upper layers 12 and 11 down to terminate at, or just short of, the bottom facer FS. At the same time, downwardly open slits 14, which extend through the lower layers 11 and 12 to a point just short of, or at the upper layer of paper 12, are cut by a lower cutter. While the product I is shown as preferably incorporating the Kraft paper layer 11 on its upper and lower surfaces, it is to be understood that, in some instances, the upper and lower facer strips FS may comprise simply the plastic films 12 adhered directly to the foam core surfaces.

In FIG. 2, an infeed conveyor table, generally designated C, is shown as having powered rollers r in longitudinally spaced relationship for feeding the board I into the slitting machine, generally designated SL. The slitting machine frame F includes a lower base 15 and an upper head 16 which, between them, provide an elongate tunnel 17 which is substantially open at its sides to enhance cooling of the board I. It will be seen that longitudinally spaced apart tables 18 are fixed lengthwisely in the tunnel portion 17 for receiving the sheet insulation board I from the table conveyor C.

Also provided within the tunnel 17, are motor driven forwarding rolls 19 in longitudinally spaced relation, mounted rotatably on hangers 20 which are pivoted to the head 16 of the machine at intervals as at 21. It is to be noted that the hangers 20 incline downwardly at a forwardly extending angle and will be initially raised by the board I when contacted by its front end, their weight keeping the rolls 19, however, in engagement with the upper surface of the board I in driving engagement with the board I. The advancing rolls 19, it will be observed, are mounted directly above the tables 18 so that the board I is well supported from below when it is driven by the advancing rolls 19.

The head 16 also supports clamping platens 22 which are disposed above the spaces 18*a* provided between the tables 18 and which are of a length to span the tables 18 adjacent each space 18*a*. Each of the clamping platens 22 may be moved upwardly and downwardly by pressure fluid operated cylinders 22*a* which have their piston rods attached to the stems 22*b* of the platens 22.

As FIG. 5 indicates, a system of alternating upper and lower knives 23 and 24 is provided, each knife being powered and moved transversely across the board I by a transversely extending cylinder 25 secured to the frame. It will be noted that the slitting knives 23 are located substantially centrally above the tables 18 and the knives 24 are located within the spaces 18*a*. The alternating upper and lower knives 23 and 24 cut the slits 13 and 14 respectively, preferably in unison. It will be observed that the knives 23 and 24 have triangularly-shaped cutters 23*a* and 24*a*, which have both free edges sharpened to provide knife surfaces.

As FIG. 3 indicates, there is a raisable and lowerable gate bar 27 powered by cylinders 28 fixed to the frame F at the discharge end of the machine to halt the inward travel of the board I in the first place. When the insulation board I comes into contact with the raisable and lowerable gate 27, an electric eye, generally designated 29, is energized.

As FIG. 4 schematically indicates, longitudinally spaced guide bars 30 are provided at one side of the machine fixed to frame F in position to laterally position a board I which is fed all the way into engagement with the stop gate 27. The board I is moved laterally into engagement with the guide bars 30 forming the guide bar system by pushers 31 powered by cylinders 32 secured to the frame F. Typically, the guide bars 30 will be located laterally outside the tables 18 and platens 22 and will be longitudinally spaced apart to provide spaces between them for the upper and lower knives 23 and 24 and pushers 31 so that guide bars 30 do not interfere with the operation of the slitting members 23 and 24 or pushers 30.

Located at the front end of the slitting machine SL, is the accordion folding station AS. Forwardly of conveyor table C are the laminating station LS and the cutting station CS. An electric motor M which can be used for driving each of the advancing rolls 20 is depicted in circuit diagram FIG. 7.

The Operation

Figure 7:
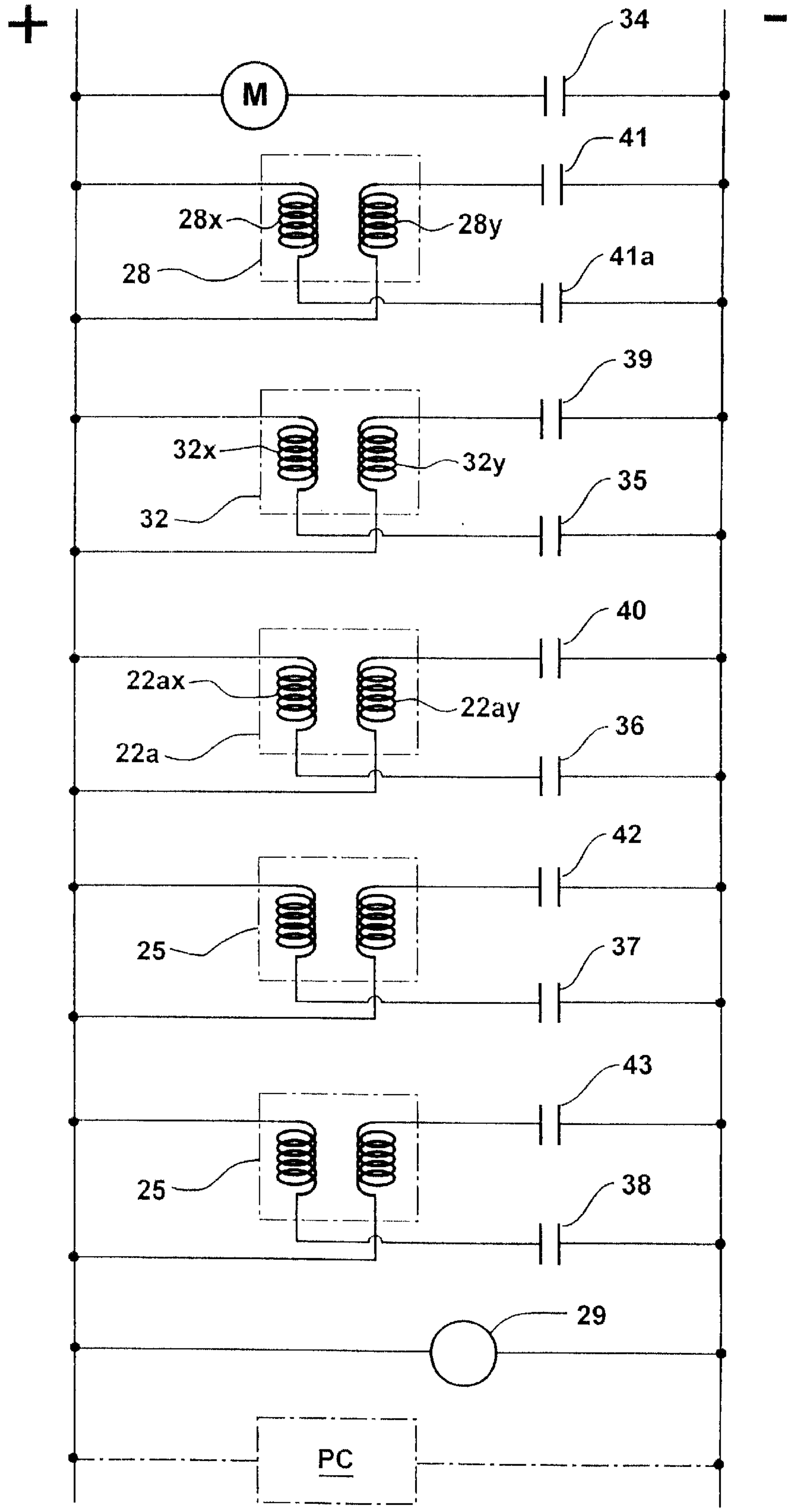
FIG. 7 is a greatly simplified and schematic control diagram.

It is to be understood that the operation of the system may be controlled by a programmable controller PC (FIG. 7) with suitable provision for operation of the elements of the system out of sequence where that may be required by the dictates of repair and maintenance. FIG. 7 depicts the elements in simplistic fashion only to illustrate a typical system of control. For example, only one motor M or one cylinder is depicted for the sake of simplicity where a plurality are operated in unison. The cylinders are conveniently shown as double-acting cylinders having advancing and retracting solenoids which have been designated by their respective numerals with x and y suffixes respectively. Appropriate contacts have then been included in each circuit line.

Figure 6:
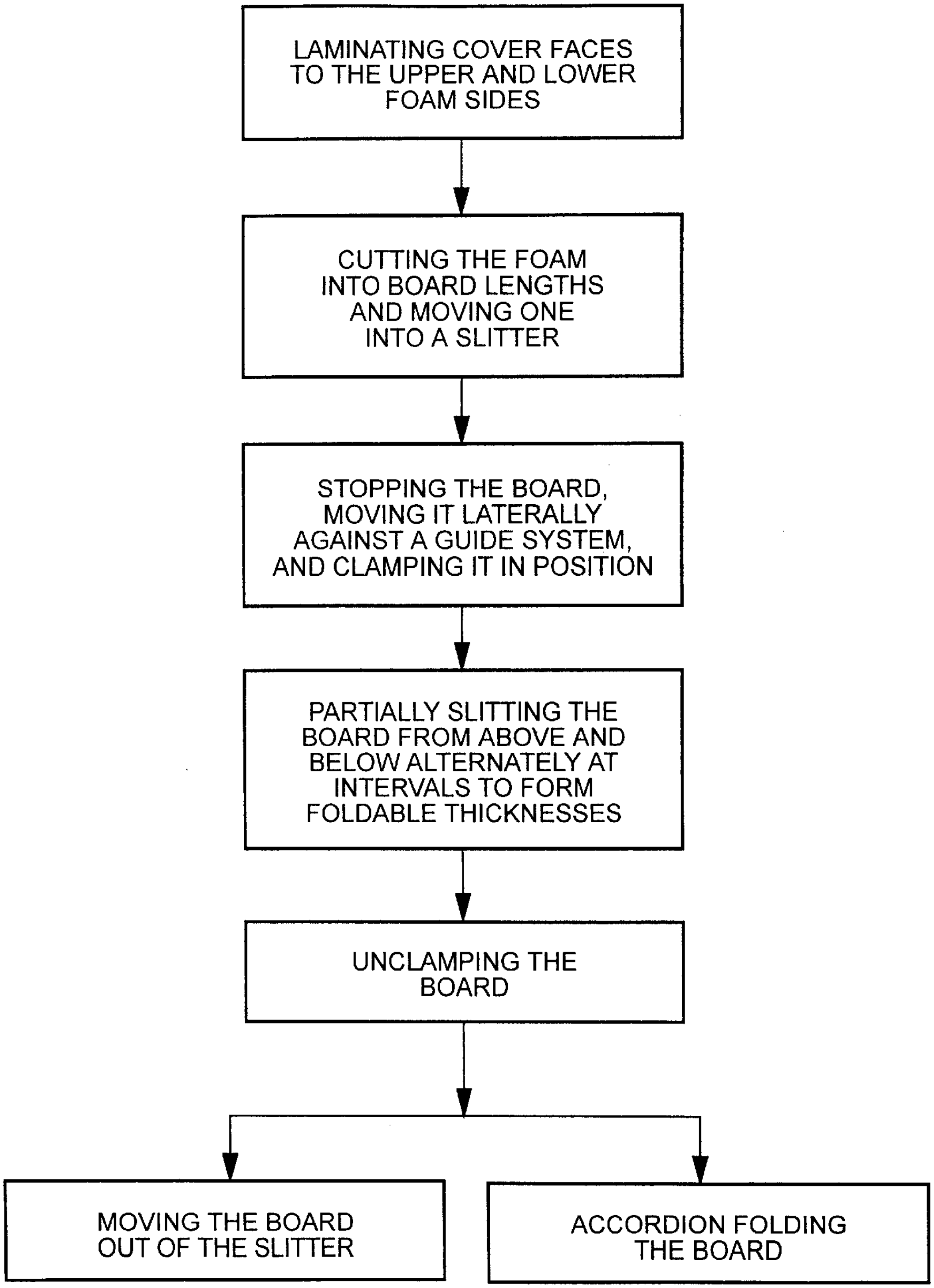
FIG. 6 is a line diagram which includes the various steps involved in the method.

An operational diagram is shown in FIG. 6, wherein it is to be understood that the foam board I proceeds from the laminating station LS in which the cover films are bonded to the foam core in a production line leading to the slitter machine SL. Typically at station LS, the foam will proceed from an extruder at a considerably elevated temperature, with the cover film being bonded to the upper and lower sides of the emerging film board in a well-known manner.

The laminate I preferably proceeds to a cutting station CS where the laminate is cut into board lengths of typically 50 feet in length. Once this occurs, the temperature-elevated foam board moves into the slitting machine shown in FIG. 2 from roller conveyor C along the platforms presented by the tabletop surfaces 18. As is the board I moves forwardly, it raises the advancing rolls 19, which are, at the time, rotating in a direction to advance the board I, and the board I continues to be driven along the table surfaces 18 by the rolls 19 until it reaches and is halted by blocking gate 30. The electric eye 29 is energized by the board I and is responsible for then deenergizing each of the motors M via contacts 34. Still further, eye 29 is responsible for energizing the advancing solenoids of each cylinder 32 via contacts 35 to extend the pushers 31 to move laterally and push the board I into engagement with the guide system 30 and, in effect, both align it and laterally clamp it against the bar system 30. Then, each double-acting cylinder 22*a* operating a platen 22 is operated via contacts 36 to cause platens 22 to descend to clamp the board I from above firmly against the tabletops 18. With clamping accomplished, cylinders 25 are operated to cause knives 23 and 24 to move laterally in unison and cut the slits 13 and 14. This cutting is facilitated because the board I is at an elevated temperature in the nature of 120° F. The contacts 37 are involved in the case of slitter 23 and the contacts 38 in the case of slitter 24.

Once the slitters 23 and 24 have traveled across the board in opposite directions, they remain halted and the next step involves unclamping of the board. Cylinders 32 and 22*a*; are retracted via contacts 39 and 40 respectively and then contacts 41 are energized to cause cylinders 28 to retract and remove the stop gate 27 from board-blocking position. When this occurs, the motors M are energized via contacts 34 and rollers 19 move the board I forwardly out of the slitting machine SL to the accordion folding station AS.

The next slitting operation is carried out identically, with the stop gate 27 being moved back to board halting position initially upon closing of contacts 41*a*, except that the cylinders 25 operating knives 23 and 24 are now activated by contacts 42 and 43 to move across the sheet I to their return positions and cut slits 13 and 14 in the next foam board I in the process.

The disclosed embodiment is representative of a presently preferred form of the invention, but is intended to be illustrative rather than definitive thereof. The invention is defined in the claims.

I claim:

1. A method of treating foam board to permit it to be accordion folded comprising:

a. moving an elongate foam board at a less than deforming temperature along a longitudinal pathway into a slitting machine;

b. stopping the longitudinal travel of said board;

c. providing a longitudinally extending side guide system and power operated actuators, and operating said actuators to move said board laterally and hold it against said guide system after stopping said longitudinal travel, thereby releasably securing said elongate board in stationary position; and d. laterally moving longitudinally spaced, longitudinally alternately positioned upper and lower slitting members across the board to produce slits having a depth less than through the thickness of the board and leave a foldable thickness in the board, and releasing said board for travel toward a folding station where it can be accordion folded.

2. A method of treating foam board to permit it to be accordion folded comprising:

a. moving an elongate substantially rigid foam board at a less than deforming temperature along a longitudinal pathway into a slitting machine;

b. stopping the travel of said board;

c. clamping said elongate board in stationary position; and d. laterally simultaneously moving pairs of longitudinally spaced upper and lower slitting members, which produce slits less than through the thickness of the board and leave a foldable thickness, across the board, and releasing said board to travel forwardly toward a folding station where it can be accordion folded, said clamping of said board including providing a series of longitudinally spaced energizable upper clamping platens and energizing said platens to vertically move them down into board securing position; and e. said method, after slitting takes place, including energizing said platens to move said platens vertically upwardly to unclamp said board.

3. The method of claim 2 comprising providing a longitudinally extending series of spaced apart support tables to support said board from beneath and moving said platens downwardly from above said tables to secure said board between the tables and said platens.

4. The method of claim 2 wherein said step of stopping said board comprises providing a stop gate adjacent said pathway which is movable from a remote position into the path of said board, and moving said stop gate into position to block said board.

5. The method of claim 4 wherein the board is released by removing said stop gate and raising said platens upwardly.

6. The method of claim 1 comprising laminating a cover film to both sides of said board to form a composite laminate and cutting said laminate into discrete elongate longitudinal lengths.

7. The method of claim 6 wherein said cover film is provided as a plastic coated Kraft paper and said slitting is vertically through the cover film substantially as far as the opposite cover film.

8. The method of claim 1 comprising providing a slitting machine forming an elongate longitudinal open-sided tunnel and moving said foam board into said tunnel before stopping it.

9. The method of claim 1 wherein said foam board is polyisocyanate at a temperature less than its deformation temperature.

10. A method of treating foam board to permit it to be accordion folded comprising:

a. moving an elongate substantially rigid foam board at a less than deforming temperature along a longitudinal pathway into a slitting machine;

b. stopping the travel of said board;

c. clamping said elongate board in stationary position; and d. laterally simultaneously moving pairs of longitudinally spaced upper and lower slitting members, which produce slits less than through the thickness of the board and leave a foldable thickness, across the board, and releasing said board to travel forwardly toward a folding station where it can be accordion folded, said step of moving said board along a longitudinal pathway including providing driven rollers above said board for engaging the upper surface of said board, and driving said rollers to advance said board.

11. The method of claim 10 comprising providing said rollers on pivoted arms extending at an angle downwardly and forwardly so that the rollers can be raised by the front end of the board and remain in engagement with the upper surface of said board.

12. The method of claim 1 wherein said board is a closed cell foam on the order of about one-half inch in thickness with a cover film on top and bottom which is polypropylene or polyethylene of about one mill in thickness with a Kraft paper inner face of about 0.00858 in thickness, said slitting extending through said board and one of said cover films to substantially leave the other cover film as said foldable thickness.

13. The method of claim 1 wherein said alternating slitting members are provided in longitudinally spaced pairs spaced from one another longitudinally the spaced distance between said alternating slitting members, and said members of each said pair move in unison in opposite directions laterally, and the steps of claim 1 are repeated with the slitting members of each pair then moving laterally in opposite directions to a return position.

14. The method of claim 3 wherein said lower slitting members are provided in the spaces between said tables, said platens are provided to span said tables above said lower slitting members, and power operated actuators are provided as pushers in some of the spaces between said tables adjacent said lower slitting members to move said board laterally and clamp it against said side guide system.

15. A method of treating foam board to permit it to be accordion folded comprising:

a. moving an elongate substantially rigid foam board at a less than deforming temperature along a longitudinal pathway into a slitting machine;

b. stopping the travel of said board;

c. clamping said elongate board in stationary position; and d. laterally simultaneously moving pairs of alternately longitudinally alternately spaced upper and lower slitting members, which produce slits less than through the thickness of the board and leave a foldable thickness, across the board, and releasing said board to travel forwardly toward a folding station where it can be accordion folded, and wherein said alternating slitting members are provided in a longitudinal series of pairs extending the length of the board with said pairs being spaced longitudinally from each other and the ends of said board substantially the longitudinally spaced distance between said alternating slitting members.

16. The method of claim 1 wherein said slitting members are provided as laterally double edged blades to cut when moved laterally in either direction.

* * * * *